(12) United States Patent
Tenenbaum et al.

(10) Patent No.: US 12,392,116 B2
(45) Date of Patent: *Aug. 19, 2025

(54) METHOD AND SYSTEM FOR EXTRACTING WATER WITH CONSIDERATION OF THE RECHARGE RATE AND OTHER FACTORS TO PROTECT THE AQUIFER

(71) Applicants: Ofer Tenenbaum, Napa, CA (US); George Stuart Richmond, Fairfield, CA (US); Dana Myers, Fairfield, CA (US); Andrew James Emerick, Pasadena, CA (US); Mahdad Talebpour, Corvallis, OR (US)

(72) Inventors: Ofer Tenenbaum, Napa, CA (US); George Stuart Richmond, Fairfield, CA (US); Dana Myers, Fairfield, CA (US); Andrew James Emerick, Pasadena, CA (US); Mahdad Talebpour, Corvallis, OR (US)

(73) Assignee: LAMARR, INC., Fairfield, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 18/197,680

(22) Filed: May 15, 2023

(65) Prior Publication Data

US 2023/0374759 A1    Nov. 23, 2023

Related U.S. Application Data

(60) Provisional application No. 63/344,306, filed on May 20, 2022.

(51) Int. Cl.
*E02B 3/08*    (2006.01)
*E03B 3/06*    (2006.01)
(Continued)

(52) U.S. Cl.
CPC ............... *E03B 3/06* (2013.01); *E03B 5/06* (2013.01); *H04L 67/125* (2013.01)

(58) Field of Classification Search
CPC ..... E03B 3/06; E03B 5/06; E02B 3/08; E02B 3/34; E21B 43/121; E21B 47/047; E21B 2200/20; H04L 67/125
See application file for complete search history.

(56) References Cited

U.S. PATENT DOCUMENTS 9,784,093 B2 * 10/2017 Bourgeois ............... G01F 23/24
11,622,513 B2 * 4/2023 Gungl ................. A01G 25/167
700/282

(Continued)

*Primary Examiner* — Benjamin F Fiorello
(74) *Attorney, Agent, or Firm* — Adam Warwick Bell; Matthew Rupert Kaser

(57) ABSTRACT

A water extraction system including a water well coupled to an aquifer, a distribution line in communication between the water well and a use element, and a pump coupled to the water well for moving water from the water well to the use element at a pump rate. A well sensor and associated well mote collect water level data and upload the collected water level data to a server. A communication device is coupled to the server and an application carried by one of the server and the communication device calculates the rate of recharge of the well from the collected water level data. A pumping strategy is developed by the application using the recharge rate to determine an altered pump rate.

23 Claims, 5 Drawing Sheets

(51) Int. Cl.
*E03B 5/06* (2006.01)
*H04L 67/125* (2022.01)

(56) References Cited

U.S. PATENT DOCUMENTS

| | | | |
|---|---|---|---|
| 11,852,148 B2* | 12/2023 | Davidson | F04D 15/0088 |
| 2012/0041692 A1* | 2/2012 | Suk | E03B 3/06 |
| | | | 702/45 |
| 2014/0195174 A1* | 7/2014 | Machuga | G01N 33/1886 |
| | | | 702/55 |
| 2014/0350856 A1* | 11/2014 | Lambie | G01W 1/00 |
| | | | 702/3 |
| 2015/0294050 A1* | 10/2015 | Chmakov | G01V 20/00 |
| | | | 703/2 |
| 2017/0097647 A1* | 4/2017 | Lunani | C02F 1/008 |

* cited by examiner

METHOD AND SYSTEM FOR EXTRACTING WATER WITH CONSIDERATION OF THE RECHARGE RATE AND OTHER FACTORS TO PROTECT THE AQUIFER

CROSS-REFERENCE TO RELATED APPLICATION

This application claims the benefit of U.S. Provisional Application No. 63/344,306, filed 20 May 2022.

FIELD OF THE INVENTION

This invention relates to extracting water from an aquifer. More particularly, the present invention relates to monitoring and controlling the extraction of water from an aquifer.

BACKGROUND OF THE INVENTION

Much of the freshwater used today is provided by groundwater found in aquifers. Groundwater is pumped from aquifers through the use of wells. Removing water from an aquifer can have consequences. Fresh and potable groundwater, while renewable, is limited. The only natural source of water on land is precipitation. Precipitation can eventually become groundwater. Because of a slow rate of travel, limited recharge areas, evaporation from surfaces, faster runoff from overland due to land cover/land use changes, and intensifying extraction and demand in many places, groundwater is being extracted faster than it is being replenished. When groundwater is extracted faster than recharge can replace it, groundwater levels decline and areas of discharge can diminish or dry up completely. This over extraction of groundwater can lead to dry wells, reduced spring and streamflow, increase groundwater pollution from deeper waters, land subsidence and other damages to an aquifer. Where there is a continual lowering of the water table in an area, e.g. extraction by pumping is greater than replenishment by precipitation, groundwater mining is happening.

While a well coupled to an aquifer can provide a steady flow of water, the rate at which it flows into a well is determined by the makeup of the subsurface hydrogeologic structure in which the well is constructed and the way that the well is operated. Conventional pumping systems remove water from the well as needed for the end use or stored in holding tanks or surface reservoirs and the like. In a slow or low yield well, the water column is constantly being drawn down when demand for water exceeds the rate at which it flows into the well. Pumping water out of a well faster than it comes in is called over pumping. Periods of extended over pumping increase the rate at which water travels through the ground immediately around the well drawing in sediment that adds cloudiness to the water and may eventually clog the cracks that are the arteries in a water delivery system of the aquifer. This can result in severing the well's porous network to the aquifer. Moreover, the steady and longer periods of drop in a well's neighboring soil columns (cone of depression), will lead into subsidence of the soil column around the well. The clogging of the porous connection to the aquifer around the well and the subsidence resulted by longtime cone of depression around the well, can possibly result in a dry well. The negative effects of over pumping are cumulative and lasting. Currently, wells are typically pumped as needed regardless of the replenishment rate, since this is generally not known. Pumping is halted only when the well runs dry and the pump stops. Not only can this damage a well and an aquifer, but it can also damage the pump.

It would be highly advantageous, therefore, to remedy the foregoing and other deficiencies inherent in the prior art.

An object of the present invention is to provide a method and system for extraction of water responsibly and sustainably from an aquifer.

SUMMARY OF THE INVENTION

Briefly to achieve the desired objects and advantages of the instant invention in accordance with a preferred embodiment provided is a water extraction system. The water extraction system includes a water well coupled to an aquifer and having water at a water level that fluctuates over time and use. The water in the water well is replenished at a recharge rate from the aquifer. A distribution line is in communication between the water well and a use element. A pump is coupled to the water well for moving water from the water well through the distribution line to the use element at a pump rate. A well sensor is coupled to the well for periodic measuring of the water level to collect water level data. A well sensor mote is wirelessly coupled, using a communication protocol, between the well sensor and a server for uploading collected water level data to the server. A communication device is coupled to the server. An application is carried by one of the server and the communication device to calculate the rate of recharge of the well from the collected water level data. A pumping strategy is developed by the application using the recharge rate to determine an altered pump rate.

Also provided, is a water extraction and control method of the present invention. The method includes the steps of providing a water well coupled to an aquifer having water at a water level that fluctuates over time and use and a recharge rate. Pumping water from the water well through a distribution line to a use element at a pump rate. Periodically measuring the water level of the water well using a well sensor coupled to the water well to obtain water level data. Collecting the water level data using a well sensor mote coupled to the well sensor. Sending the collected water level data from the well sensor mote to a wirelessly coupled server using a communication protocol. Calculating the rate of recharge of the well from the collected water level data using an application carried by one of the server and a communication device coupled to the server. Developing a pumping strategy by the application using the recharge rate to determine the pump rate, and altering the pump rate as determined by the pumping strategy.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION

Figure 1:
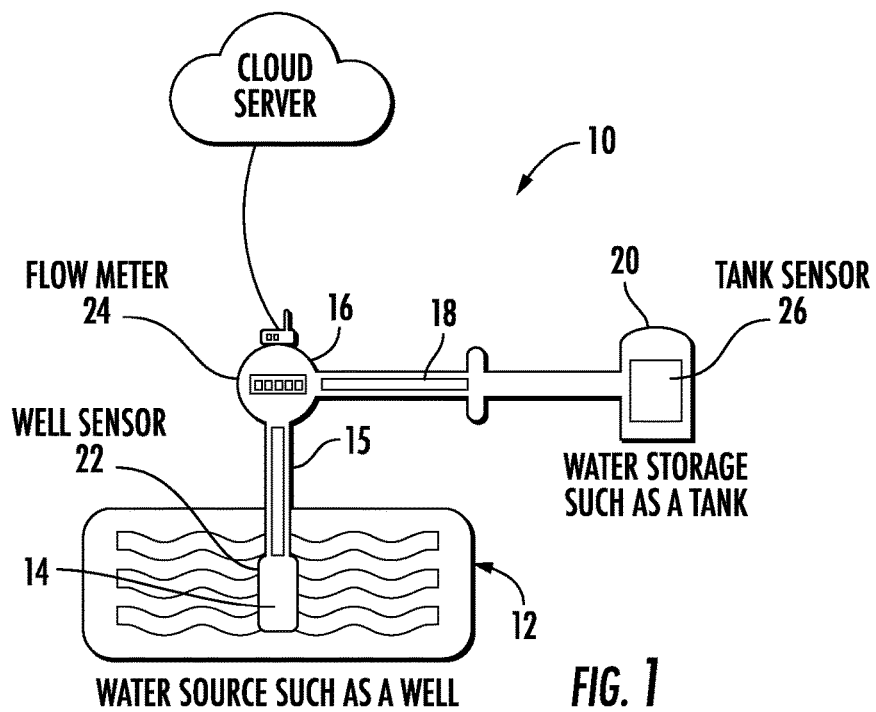
FIG. 1 is a simplified schematic diagram of a water extraction system for pumping water from a well to a storage tank, according to the present invention.

Turning now to the drawings in which like reference characters indicate corresponding elements throughout the several views, attention is directed to FIG. 1 which illustrates a water extraction system generally designated 10. Water extraction system 10 preferably includes a well 12. Well 12 is substantially any type of well typically coupled to and fed by a water source such as an aquifer. While not always the case, well 12 conventionally includes a well casing extending from the ground surface to some point below the water level. The casing is a tubular structure that is placed in the drilled well to maintain the well opening. The casing keeps possibly contaminated surface water from entering the aquifer underground from the well opening and prevents surface contaminants from mixing with the water. The casing also holds back sediments so that they do not collapse into well 12. System 10 of the present invention includes a pump 14 positioned proximate the bottom of well 12, below the waterline, and connected to a standing pipe 15 extending upwardly to a well opening 16. From well opening 16 a distribution line 18 directs pumped water to a use element such as a storage element, in this preferred embodiment, a storage tank 20. Thus, pump 14 pumps water collected in well 12 to storage tank 20 though standing pipe 15 and distribution line 18. While a storage tank 20 is the storage element in the preferred embodiment, other storage elements such as ponds, lakes, other surface reservoirs and the like can be used. Additionally, while a storage element is the use element used in this preferred embodiment, it will be understood that water can also be directly fed to some other use elements, such as sprinkler systems, irrigation, or any water use as desired.

Still referring to FIG. 1, system 10 further includes a well sensor 22 to measure the water level in well 12. Well sensor 22 measures the water level in well 12 and can be a barometric sensor (as illustrated in FIG. 1) positioned above pump 14 at the base of well 12 or an ultrasonic sensor positioned at ground level at well opening 16. The barometric sensor measures the hydrostatic pressure above the sensor and uses this to calculate the total liquid depth in well 12 above sensor 22. A flow meter 24 is carried at well opening 16 or anywhere along standing pipe 15 or distribution pipe 18, to measure the rate of water flow from well 12. A tank sensor 26 (storage element sensor) measures the water level in tank 20 (can be a barometric sensor carried at the base of tank 20 or an ultrasonic sensor positioned at the top of tank 20.

Figure 2:
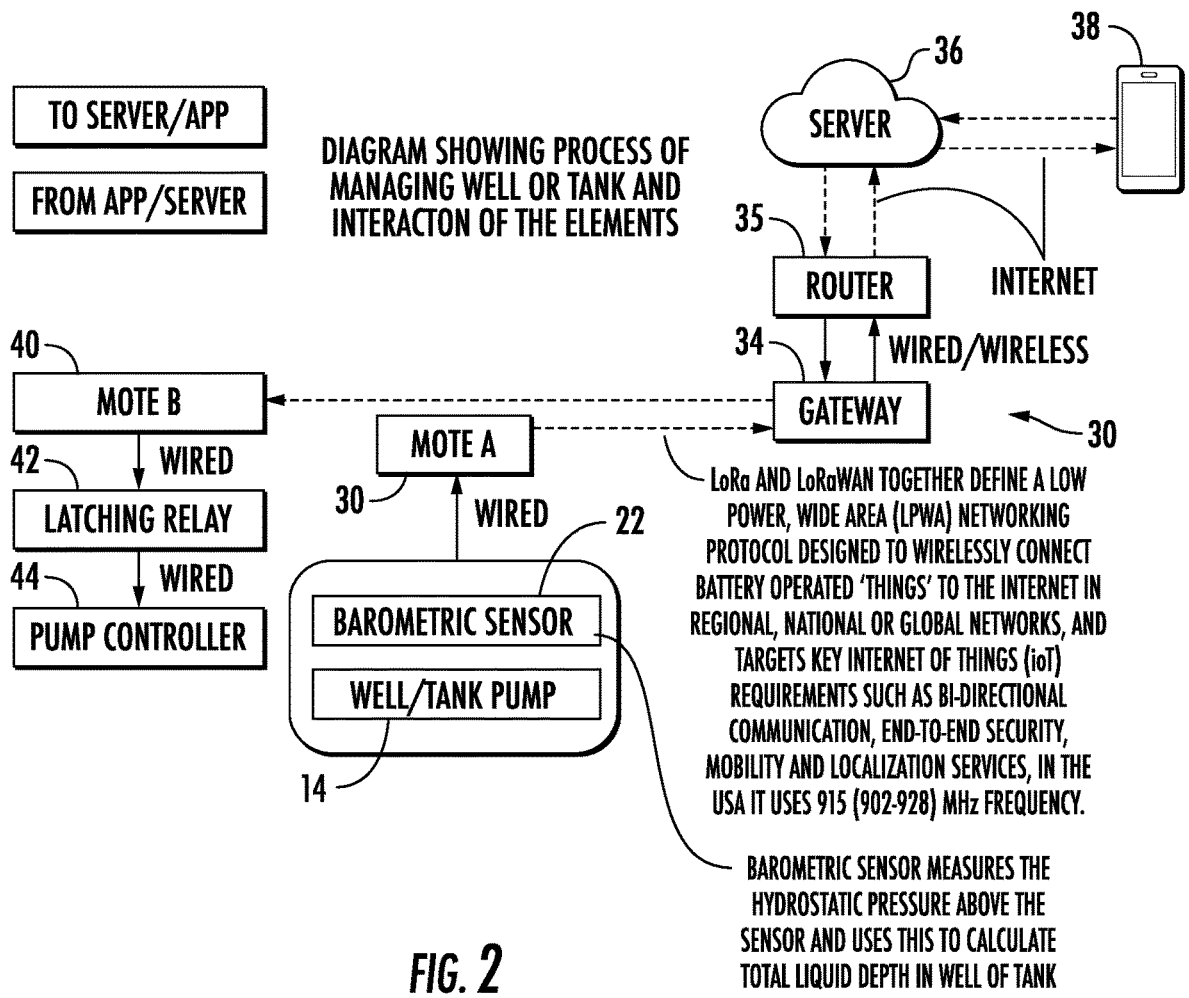
FIG. 2 is a simplified schematic diagram of a sensing and control system of the water extraction system according to the present invention.
Figure 3:
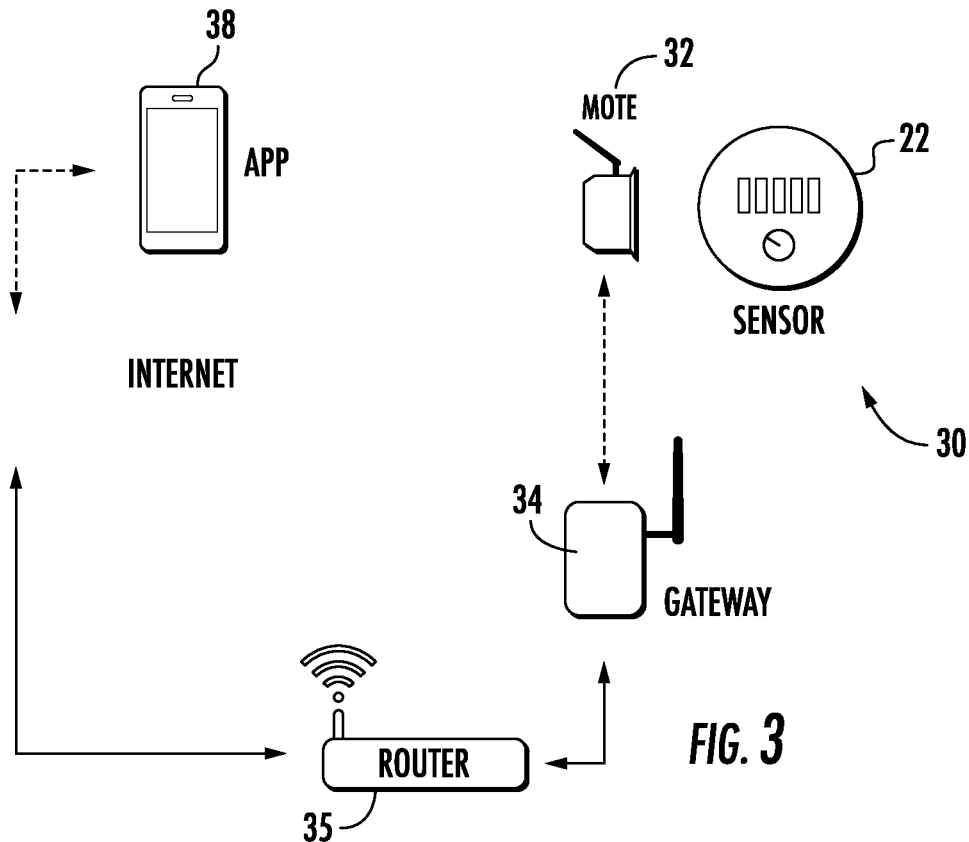
FIG. 3 is a schematic illustrating the connectivity of the monitoring and control system.

With additional reference to FIGS. 2 and 3, a sensing and control system generally designated 30 of water extraction system 10 is illustrated. Sensing and control system 30 includes a mote 32 coupled to well sensor 22. A mote is a small, low-cost, low-power computer which monitors one or more sensors. The mote connects to the outside world with a radio link. In the present invention, mote 32 sends uplinks, with data collected by well sensor 22, via LoRaWAN (915 MHz in US) to a gateway 34 that is then internet-connected through a router 35, reporting to a server 36 and then to an application, which serves as an interface for management of the system, carried by a communication device 38 such as a smart phone and the like. LoRa and LoRaWAN together define a low power, wide area (LPWA) networking protocol designed to wirelessly connect battery operated "things" to the internet in regional, national and global networks, and targets key internet of things (IoT) requirements such as bi-directional communication, end-to-end security, mobility and localization services. In the US LoRWAN uses 902-928 Mhz frequency. While the previous is preferred, it is simply one example of a communication protocol. It will be understood that other communication protocols can be used such as traditional IP networks or other long range low power networks. As another example, TCP/IP protocol can be used. The application receives information from mote 32 and makes decisions about water use or conservation and identification of unusual behavior patterns, e.g. water loss/leak. Upon receiving the information from well sensor 22, the application carried by device 38 generates control signals and sends them to a mote 40 through server 36, router 35, and gateway 34. Mote 40 operates pump 14 as directed by the application through a latching relay 42 and a pump controller 44. It will also be understood that while a downloadable application can be carried by device 38 which receives data from server 36, the application can be supplied by server 36 as Software as a Service (SaaS) which allows users to connect to and use cloud-based apps over the Internet. SaaS provides a software solution that is purchased on a pay-as-you-go basis from a cloud service provider. The use of an app is essentially rented, and the users connect to it over the Internet, usually with a web browser. All of the underlying infrastructure, middleware, app software, and app data are located in the service provider's data center.

Figure 4:
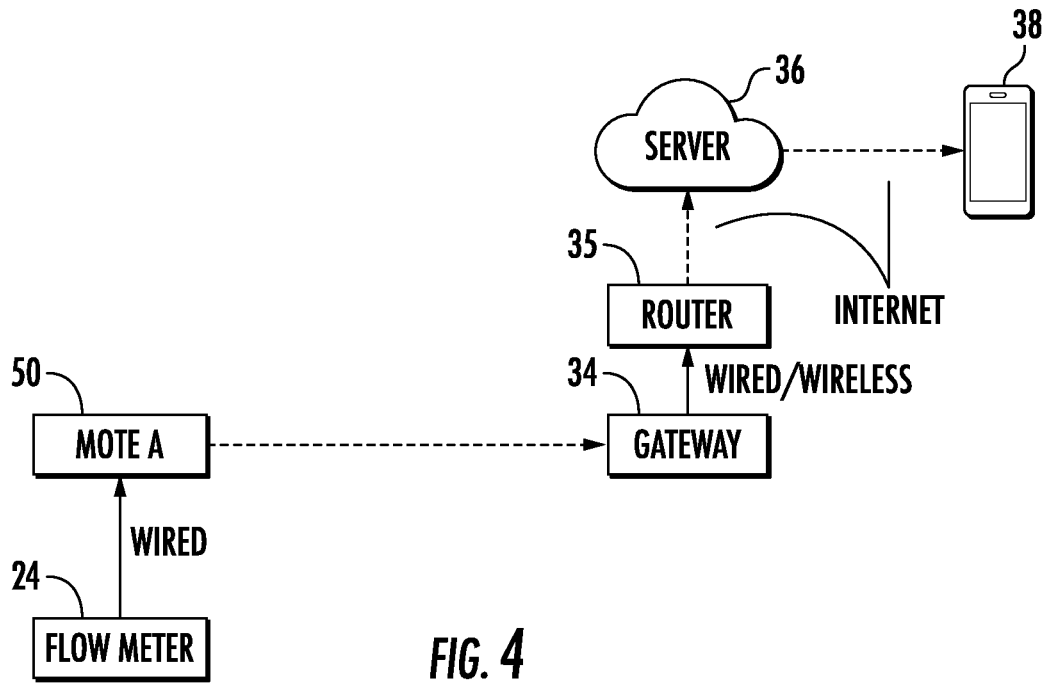
FIG. 4 is a simplified schematic diagram of the sensing and control system of the water extraction system according to the present invention showing the flow meter.

Referring now to FIG. 4, sensing and control system 30 of water extraction system 10 further includes a mote 50 coupled to flow meter 24. Mote 50 sends uplinks, with data collected by flow meter 24, via LoRaWAN (915 MHz in US) to gateway 34 that is then internet connected through a router 35, reporting to a server 36 and then to an application, which serves as an interface for management of the system, carried by a communication device 38 such as a smart phone and the like. Again, this can be a Saas operation as described previously. In this preferred embodiment, mote 50 has a built-in battery soldered to the motherboard giving the whole device a shelf life of about 5 years, after which it needs to be replaced.

In operation, system 10 uses a number of technological components (sensors and communicators), as described previously, working together at well 12, well pump opening 16 and water tank 20 and communicate together using LoRaWAN (Long Range Wide Area Networks) and integrate with software in the cloud (SaaS) to automate water extraction and management. Changes in water level of the well are sensed and the rate of extraction of water from the well is identified. With this information, the rate of recharge of the well can be determined by calculating the volume of water in the well, measuring the extraction flow (flow rate, likely pump rating), and measuring the water table drop over time during extractions. The volume of water in the well is calculated given the physical dimensions of the well and the height of the water table. Using successive measurements of well water level over time (sequence of data points with timestamps and water level) the water level rate of change can be computed. And therefore, knowing the volume of water in the well, the water volume rate of change can also be calculated. Knowing the flow rate as measured, the recharge rate can be computed with a simple mass balance equation since (in an idealized scenario) recharge+water volume rate of change=volume flow rate. While this calculation can be complicated by obstructions in the well or other losses/leaks, this is a small and negligible source of error or uncertainty that can be addressed by making some assumptions as to values. This calculation will yield the recharge rate of the well. A trend line is produced by repeating this calculation over multiple time units. The yield and recharge rate is tracked over time to establish precedence, which is then used to predict a rate for current extraction while evaluating new data for adjustments. It should be understood that both the recharge rate while the pump is on and the recharge rate/recovery rate with the pump off are measured. The data points for running this calculation are water level, well dimensions, flow rate and pump start/stop times. Determining a recharge rate for a single point in time is generally insufficient for the instant invention because of the dynamic changes involved with natural aquifers and other external factors such as delays in reporting, syncing times of pump operations and asynchronous reports, creating solid averages to compensate for the above gaps, and predictability stats. In order to address these factors, the variables will reference sample data across time (for example a 10 hour period) as the LoRa reporting is not synchronous.

The purpose of system 10 of the present invention is to optimize water extraction while minimizing the stress placed on the well/aquifer under the user-supplied constraints of needing X amount of water in Y amount of time. Other optimization targets can include, for example, well health, aquifer health, energy cost/power consumption, soil structure around the well (preventing land subsidence), tying pumping more closely and automatically with actual water use, and the like. To meet some of these other optimization strategies, hardware to monitor power use and consumption for all devices (especially the pump), leak detection hardware in water system 10, additional flow meter(s) and the like can be employed. A monitoring well can also be used. A monitoring well is cheaper than a production well and can provide much better information regarding water decline, aquifer properties in the Theis method (as an alternative or in conjunction with calculation of recharge rate based on mass balance) as will be discussed presently.

The collected data as described previously, is processed using various algorithms to develop pumping strategies optimizing water extraction for specified criteria. There is a need to measure expected/typical flow rate of water from the well pump. This is accomplished using an algorithm for automatically detecting periods of pump on/pump off based on input flow meter data, and using an algorithm for smoothing raw flow rate data during pump on periods to identify typical average flow rate. An equation (mass balance) for computing the water recharge rate in the well, using measurements of the well water level over time combined with the flow rate data of water out of the well (note that this equation can include additional complexities and refinements to account for objects in the well, like the cables fed down to the pump/sensor), is as follows:

$$\dot{V}_{in}(t) = \pi R^2 \dot{h}(t) + \dot{V}_{pump}(t).$$

Vin (with dot) is the recharge rate (the dot indicates a quantity is a rate of change); R is the well radius;
h dot is the rate of change of the well water level (this is computed by taking the derivative of the water level measured by the well water level sensor);
Vpump (with dot) is the water flow rate measured/computed from the flow meter sensor.

If the flow rate data is not known, not measured by a sensor, an algorithm can also be used to fit historical pump drawdown and recharge periods of time using a functional form (such as but not limited to the Theis equation) in order to extract/infer physical hydrogeologic parameters (Transmissivity (T) and Storativity (S)) about the surrounding aquifer based on water pumping and recovery behavior. The Theis algorithm can estimate T and S and can be calibrated over time to predict drawdown (drop in water level in the aquifer). Essentially, what this means is the recharge rate can be calculated using measurement data including flow rate (mass balance) or estimated using Theis and historical pumping data. Also used are algorithms to distill pump/recovery sessions from hundreds of data points into a small number of parameters (<10) that can be easily fed into a data-driven algorithm or machine learning model to power pumping strategies.

The Theis equation (Theis, 1935) is established science and an analytic solution for describing the drawdown of water in a confined aquifer. The equation is applied commonly in modeling the water table drop and cone of depression in an aquifer in response to a pumping well. It can also be used in a reverse mode to estimate flow rate from change of water table in the well and the surrounding soils. This equation is simple to use and implement and captures broad strokes behavior of wells and aquifers. It depends only on 1) the transmissivity of the aquifer (a physical property of the aquifer and is either a known quantity from direct measurements or a quantity inferred by the data), 2) the aquifer storativity (again, physical property that is either known through direct measurements or is inferred by the data), and 3) an assumption of the pumping/flow rate of water out of the well (treated as a constant value in this formula, and which can be obtain from knowledge of the pump and pump capabilities in absence of a flow meter. This formula then gives an estimate of the water drawn down as a function of radial distance from the well and time. When the radial distance is set near the wells casing, this effectively models the change of the water level of the well during drawdown (well pump is on) or recharge (well pump is off).

Figure 5:
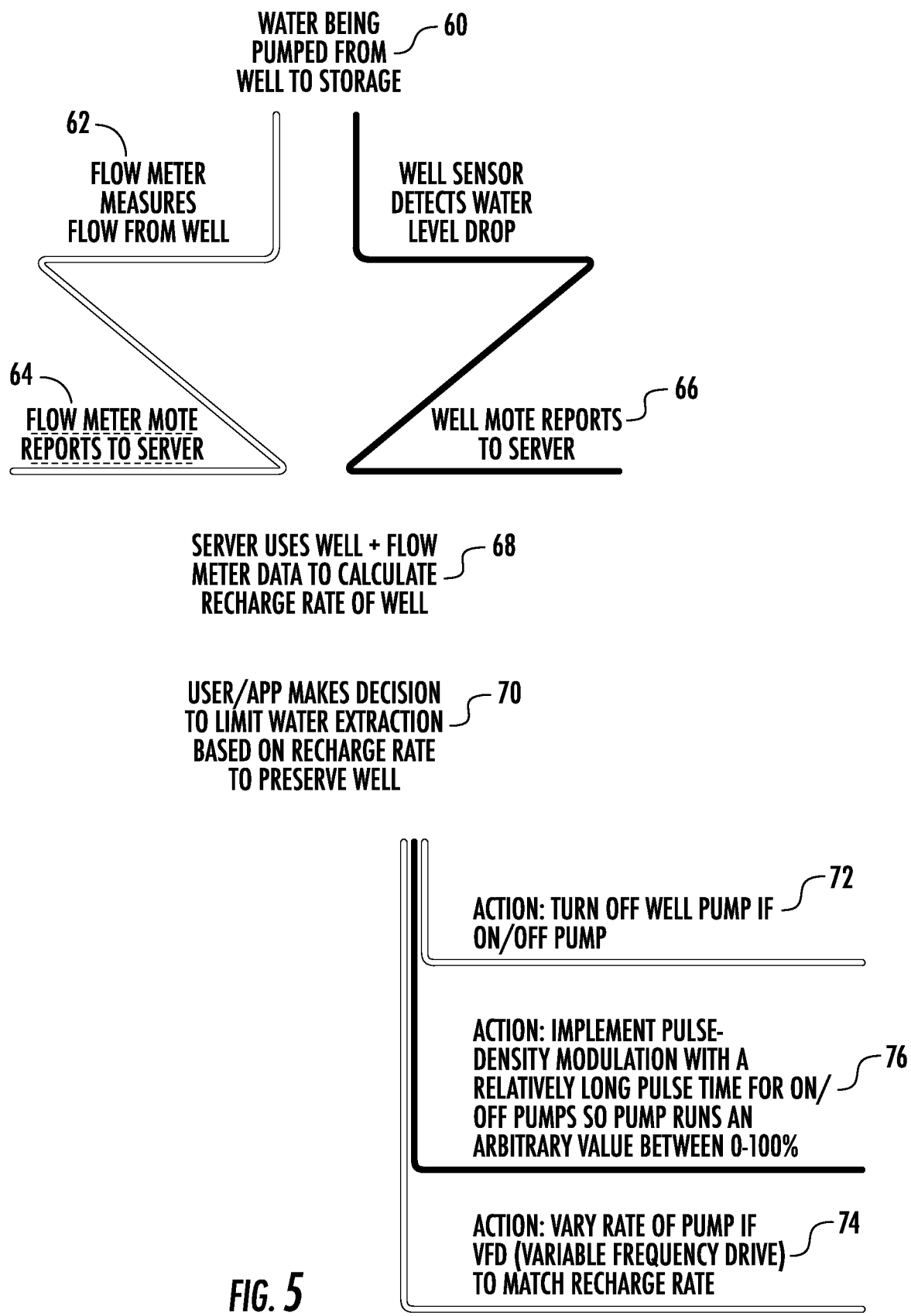
FIG. 5 is a flow diagram of water being pumped from a well to a storage tank according to a method of the present invention.

Referring now to FIG. 5, the steps used to control the water pumped from the well are illustrated. While pumping 60 water from the well, flow meter 24 measures water flow 62 from the well, and well sensor 22 measures water level at any given time. Mote 50 reports 64 the data to server 36, and mote 32 reports 66 the data to server 36. Server 36 uses the data as described previously to determine 68 the recharge rate of the well. Based on the recharge rate, the user/application makes a decision 70 (pumping strategy) controlling the extraction of water. Using the rate of recharge of the well, decisions with regard to the pumping rate of water from the well can be made. The pumping rate is altered according to the pumping strategy which is dynamic due to fluctuation in water level and recharge rate. Generally speaking, the pump is controlled to extract water at the rate of recharge. This can be accomplished by turning the pump off 72 before the well is depleted and letting it recharge before turning the pump on again. The preferable method is to have a variable speed pump which allows the pumping rate to closely match 74 the recharge rate or implement pulse density modulation 76 with a relatively long pulse time for on/off pumps so pumps run an arbitrary value between 0-100%. In conventional pumping systems, the rate of recharge is not known. When the rate of water extraction exceeds the rate of recharge, pumping continues until the end use is fulfilled (such as filling a storage tank) or the well runs dry. When a well runs dry, the well pump has a pump saver that recognizes there is no water and stops the pump. This has a number of negative consequences that can damage the well and the pump as it draws in sediment and over extracts the well/aquifer. It should also be noted that in many wells, the rate of recharge can change with the seasons, with use and other factors. This change is noted and the extraction of water is adjusted accordingly by altering the pump rate accordingly.

Figure 6:
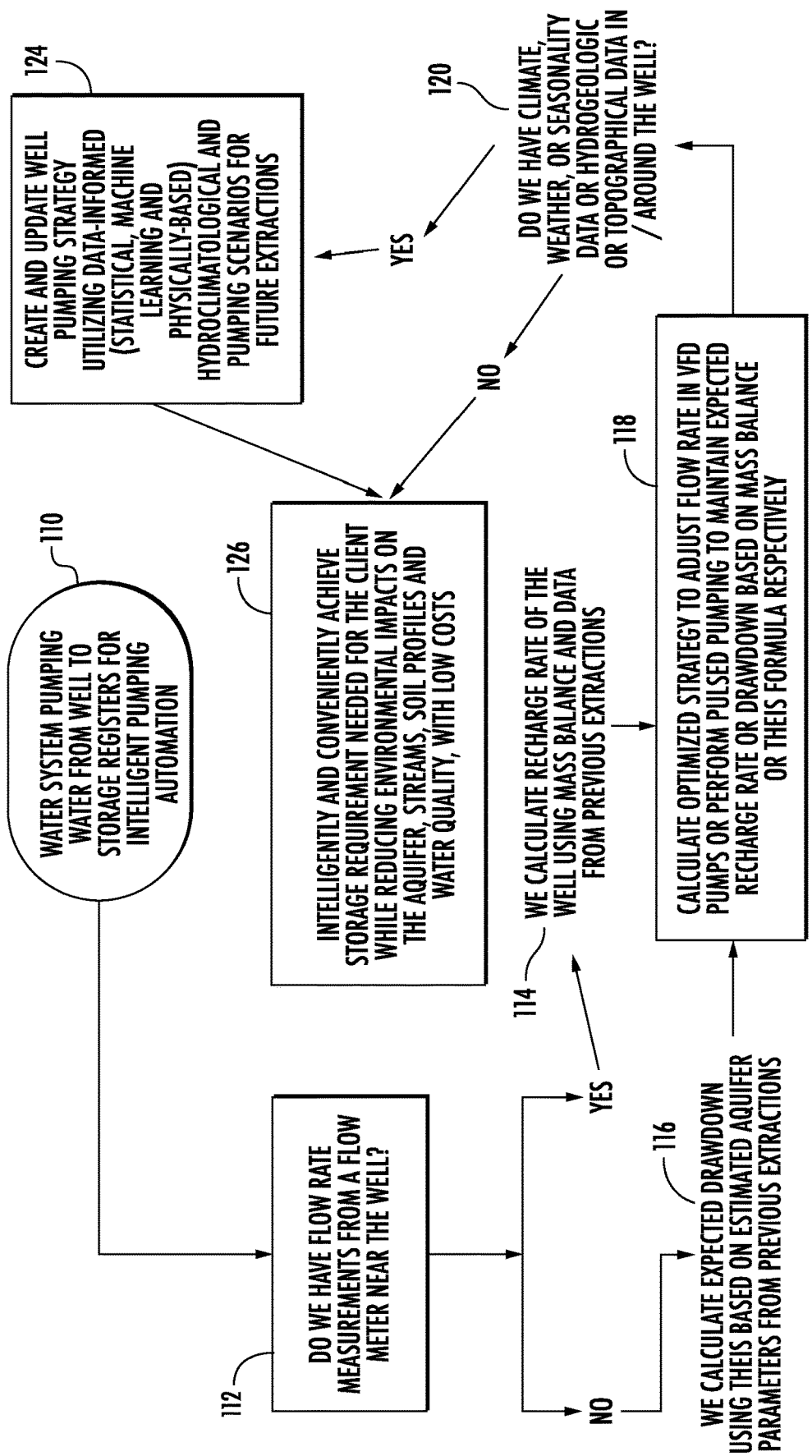
FIG. 6 is a simplified flow diagram of a process for selecting an optimized pumping strategy.

Referring now to FIG. 6, a simplified schematic diagram of the process of developing a pumping strategy is illustrated. The output of any intelligent pumping strategy will come in the form of a prescription of a sequence of instructions for (in the case of a fixed flow rate pump) when and how long to turn a pump on for (e.g. on for one hour, off for 30 minutes; on for 30 minutes, off for 30 minutes; on for 15 minutes, finish). In the case of a pump capable of a variable pump rate, this prescription will also include specification of the target pump rate for the pump (e.g. 1 hour at 15 gpm, off 30, 45 minutes at 10 gpm, off 30, and so on). These commands to the pump are what the pumping algorithm(s) have determined to be the optimal pumping strategy given the current state of the well and water system, target state/water level, and supplied constraints. A strategy is determined for a water extraction system by that system initiating process 110. There is a determination 112 if there is a flow rate measurement from a sensor at the well of that system. If there is a flow rate measurement from a flow meter at the well, then the recharge rate of the well is calculated 114 using the mass balance formula and data from previous extractions as described previously. If no flow rate measurements are made, expected drawdown is calculated using Theis 116 based on estimated aquifer parameters from previous extractions. This is essentially calculating the recharge rate using other parameters than the flow rate. In both instances, an optimization strategy is calculated 118 to adjust the flow rate in a variable-frequency drive pump or perform pulsed pumping in an on/off pump to maintain expected recharge rate or drawdown based on the mass balance or Theis formula, respectively. Then a determination 120 is made as to whether or not climate, weather or seasonality data or hydrological data in and around the well is available. If it is, an update to the pumping strategy is created 124 utilizing data-informed (statistical, machine learning and physically-based) hydroclimatological and the updated strategy is implemented 126. If such data is not available, the pumping strategy is implemented 126.

Figure 7:
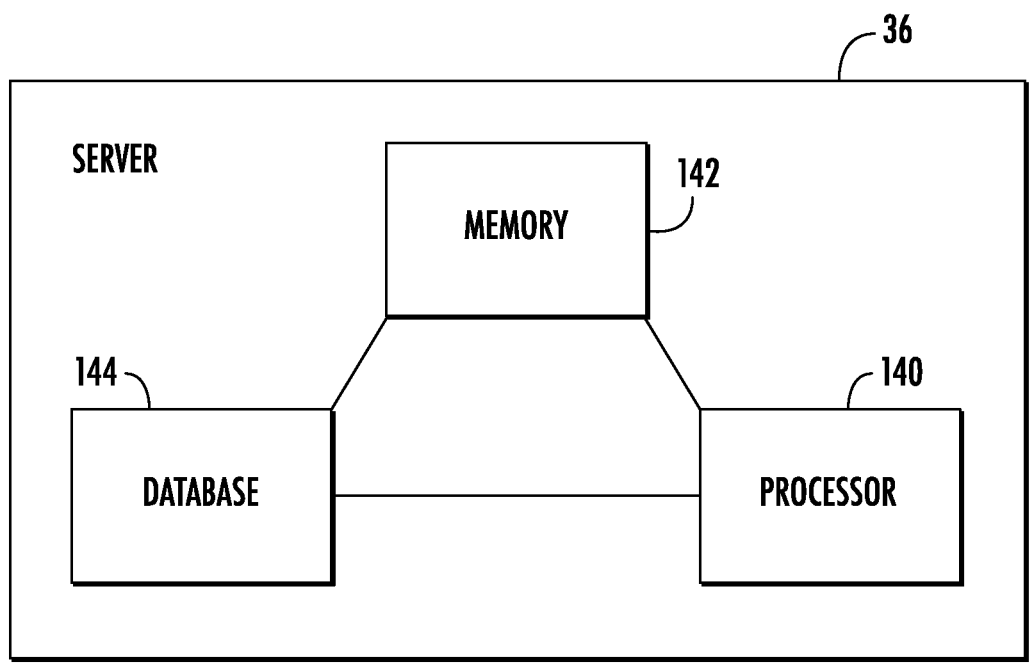
FIG. 7 is a simplified diagram of a server device.

Referring now to FIG. 7, server 36, which provides the computations for determining recharge rate and for generating a pumping strategy includes a processor 140, an application stored in a memory 142, and a database 144 for storing collected data. Memory 142 is a non-transitory computer-readable storage medium having instructions (the application) which, responsive to being executed by processor 140, generates the pumping strategy. The non-transitory computer-readable storage medium can take on a variety of forms. For instance, the medium may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, the computer-readable storage medium is non-transitory, is not a signal, is not a transient signal, and is not a propagating signal. The medium described herein is an article of manufacture. One of ordinary skill in the art understands how software application work in a server with a processor and memory for storing data and applications, so further detail is omitted.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A water extraction system comprising:
a water well coupled to an aquifer and having water at a water level that fluctuates over time and use, the water in the water well refilling at a recharge rate from the aquifer;
a distribution line in communication between the water well and a use element;
a pump coupled to the water well for moving water from the water well through the distribution line to the use element at a pump rate;
a well sensor coupled to the well for periodic measuring of the water level to collect water level data;
a well sensor mote wirelessly coupled, using a communication protocol, between the well sensor and a server for uploading collected water level data to the server;
a communication device coupled to the server;
an application carried by one of the server and the communication device to calculate the rate of recharge of the well from the collected water level data; and
a pumping strategy developed by the application using the recharge rate to determine an altered pump rate.

2. The water extraction system as claimed in claim 1, further include the well mote coupled to a gateway that is internet connected through a router to the server.

3. The water extraction system as claimed in claim 1, wherein the calculation of the recharge rate by the application uses a Theis calculation and historical water extraction data.

4. The water extraction system as claimed in claim 1, further including a flow sensor for periodic measurement of the flow rate of extracted water to the use element to collect flow rate data and coupled to the server by a flow sensor mote for uploading collected flow rate data to the server.

5. The water extraction system as claimed in claim 4, wherein the use element is a storage tank.

6. The water extraction system as claimed in claim 5, further including a tank sensor coupled to the storage tank for periodic measuring of a water level in the storage tank to collect storage tank water level data and coupled to the server by a tank level sensor mote for uploading tank water level data to the server.

7. The water extraction system as claimed in claim 6, wherein the calculation of the recharge rate by the application uses a mass balance equation.

8. The water extraction system as claimed in claim 1, wherein the pump is one of an on/off pump with the pump rate controlled by pulsing the pump, and a variable speed pump with the pump rate controlled by a variable speed setting.

9. The water extraction system as claimed in claim 8, wherein the application carried by one of the device and the server generates control signals and sends them to a pump mote coupled to the pump, the pump mote controls the pump, as directed by the control signal, through a latching relay and a pump controller.

10. A water extraction system comprising:
a water well coupled to an aquifer and having water at a water level that fluctuates over time and use, the water in the water well refilling at a recharge rate from the aquifer;
a distribution line in communication between the water well and a storage tank;
a pump coupled to the water well for moving water from the water well through the distribution line to storage tank at a pump rate; and
a well sensor coupled to the well for periodic measuring of the water level to collect water level data;
a well sensor mote wirelessly coupled, using a communication protocol, between the well sensor and a server for uploading collected water level data to the server;
a tank sensor coupled to the storage tank for periodic measuring of the water level in the storage tank to collect storage tank water level data;
a tank sensor mote wirelessly coupled, using a communication protocol, between the tank sensor and a server for uploading collected storage tank water level data to a server database;
a communication device coupled to the server;
an application carried by one of the server and the communication device to calculate the rate of recharge of the well from the collected data; and
a pumping strategy developed by the application using the recharge rate to determine an altered pump rate.

11. The water extraction system as claimed in claim 10, further include the well mote coupled to a gateway that is internet connected through a router to the server.

12. The water extraction system as claimed in claim 10, wherein the calculation of the recharge rate by the application uses a Theis calculation and historical water extraction data.

13. The water extraction system as claimed in claim 10, further including a flow sensor for periodic measurement of the flow rate of extracted water to the storage tank to collect flow rate data and coupled to the server by a flow sensor mote for uploading collected flow rate data to the server.

14. The water extraction system as claimed in claim 13, wherein the calculation of the recharge rate by the application uses a mass balance equation.

15. The water extraction system as claimed in claim 10, wherein the pump is one of an on/off pump with the pump rate controlled by pulsing the pump, and a variable speed pump with the pump rate controlled by a variable speed setting.

16. The water extraction system as claimed in claim 15, wherein the application carried by one of the device and the server generates control signals and sends them to a pump mote coupled to the pump, the pump mote controls the pump, as directed by the control signal, through a latching relay and a pump controller.

17. A water extraction and control method comprising the steps of:
providing a water well coupled to an aquifer having water at a water level that fluctuates over time and use and a recharge rate;
pumping water from the water well through a distribution line to a use element at a pump rate;
periodically measuring the water level of the water well using a well sensor coupled to the water well to obtain water level data;
collecting the water level data using a well sensor mote coupled to the well sensor;
sending the collected water level data from the well sensor mote to a wirelessly coupled server using a communication protocol;
calculating the rate of recharge of the well from the collected water level data using an application carried by one of the server and a communication device coupled to the server;
developing a pumping strategy by the application using the recharge rate to determine the pump rate; and
altering the pump rate as determined by the pumping strategy.

18. The water extraction and control method as claimed in claim 17, wherein the step of calculating the recharge rate by the application includes using a Theis calculation and historical water extraction data.

19. The water extraction and control method as claimed in claim 17, further comprising the steps of:
periodically measuring the flow rate of extracted water to the use element using a flow sensor to obtain flow rate data;
collecting the flow rate data using a flow sensor mote coupled to the flow sensor; and
sending the collected flow rate data from the flow sensor mote to the wirelessly coupled server using a communication protocol.

20. The water extraction and control method as claimed in claim 17, further including the steps of:
providing a storage tank as the use element;
periodically measuring the water level in the storage tank to collect storage tank water level data using a tank sensor coupled to the storage tank;
collecting the storage tank water level data using a tank sensor mote coupled to the tank sensor; and
sending the collected storage tank water level data from the tank sensor mote to the wirelessly coupled server using a communication protocol.

21. The water extraction and control method as claimed in claim 20, wherein the step of calculating the recharge rate by the application includes using a mass balance equation.

22. The water extraction and control method as claimed in claim 17, wherein the step of pumping water from the water well through a distribution line to a use element includes the step of using one of an on/off pump with the pump rate controlled by pulsing the pump, and a variable speed pump with the pump rate controlled by a variable speed setting.

23. The water extraction and control method as claimed in claim 17, wherein the step of altering the pump rate as determined by the pumping strategy includes generating control signals using the application carried by one of the device and the server, and sending the control signals to a pump mote coupled to the pump, the pump mote controls the pump, as directed by the control signal, through a latching relay and a pump controller.

* * * * *